US009599034B2

(12) United States Patent
Horikoshi et al.

(10) Patent No.: US 9,599,034 B2
(45) Date of Patent: Mar. 21, 2017

(54) THROTTLE ADJUSTMENT DEVICE FOR BRUSH CUTTER

(75) Inventors: Yoshinori Horikoshi, Tokyo (JP); Minoru Shibasaki, Tokyo (JP)

(73) Assignee: STARTING INDUSTRIAL CO., LTD., Tokyo (JP)

( * ) Notice: Subject to any disclaimer, the term of this patent is extended or adjusted under 35 U.S.C. 154(b) by 662 days.

(21) Appl. No.: 13/359,878

(22) Filed: Jan. 27, 2012

(65) Prior Publication Data

US 2012/0192672 A1 Aug. 2, 2012

(30) Foreign Application Priority Data

Jan. 27, 2011 (JP) ................................. 2011-014809

(51) Int. Cl.
*F16H 51/00* (2006.01)
*F02D 11/02* (2006.01)
*F02D 11/04* (2006.01)
*G05G 5/06* (2006.01)

(52) U.S. Cl.
CPC .............. *F02D 11/02* (2013.01); *F02D 11/04* (2013.01); *G05G 5/06* (2013.01); *Y10T 74/20438* (2015.01)

(58) Field of Classification Search
CPC ........... F02D 11/02; F02D 11/04; G05G 1/04; G05G 1/082; G05G 5/005; G05G 5/06; G05G 5/08; G05G 5/065; Y10T 74/20438; Y10T 74/2042; B62M 25/04;
(Continued)

(56) References Cited

U.S. PATENT DOCUMENTS 4,363,206 A 12/1982 Schmitt
4,580,455 A 4/1986 Beugelsdyk et al.
5,765,445 A * 6/1998 Miyata ......................... 74/501.6
(Continued)

FOREIGN PATENT DOCUMENTS

GB 959112 A * 5/1964 ........... B62D 51/001
JP 53-162224 5/1977
(Continued)

OTHER PUBLICATIONS

Extended European Search Report dated Sep. 13, 2013 issued in European Patent Application 12152619.8, 6 pp.
(Continued)

*Primary Examiner* — Alan B Waits
*Assistant Examiner* — Brian McGovern
(74) *Attorney, Agent, or Firm* — Nixon & Vanderhye P.C.

(57) ABSTRACT

According to one embodiment, a throttle adjustment device, for a brush cutter in which an engine is mounted at one end of a handle pipe and in which a throttle adjustment wire extends from a throttle of the engine, include: a throttle lever having an operation portion to be operated by the user; a sub lever having a holding portion to be connected with an extending end of the throttle adjustment wire; a case to be fixed to the handle pipe, the throttle lever and the sub lever being rotatably mounted in the case; and a connecting member configured to bring the throttle lever and the sub lever into: an interlocked state where the throttle is adjustable in accordance with an operation amount of the throttle lever; or an un-interlocked state where the throttle is not adjustable regardless of the operation amount of the throttle lever.

9 Claims, 8 Drawing Sheets

(58) Field of Classification Search
CPC ......... B62M 2701/0069; B62D 51/001; B62D 51/002; B60T 7/105; B60T 7/104
USPC .............. 74/473.21, 473.24, 473.26, 473.25, 74/473.28, 473.3, 473.14, 473.15, 488, 74/489, 502.2, 504, 505; 123/396, 398, 123/400, 403; 70/101, 220, 231
See application file for complete search history.

(56) References Cited

U.S. PATENT DOCUMENTS

| | | | | |
|---|---|---|---|---|
| 6,006,627 | A * | 12/1999 | Ikeda et al. | 74/531 |
| 6,039,024 | A * | 3/2000 | Carlson et al. | 123/396 |
| 6,108,867 | A | 8/2000 | Nagashima | |
| 6,581,568 | B2 * | 6/2003 | Kramer | 123/398 |
| 2008/0098775 | A1 * | 5/2008 | Don et al. | 70/101 |
| 2010/0192391 | A1 * | 8/2010 | Harada | 30/381 |

FOREIGN PATENT DOCUMENTS

| | | |
|---|---|---|
| JP | 62-130142 | 8/1987 |
| JP | 4211959 | 11/2008 |

OTHER PUBLICATIONS

Japanese Office Action dated Aug. 29, 2014 issued in Japanese Patent Application No. 2011-014809, 5 pp.

* cited by examiner

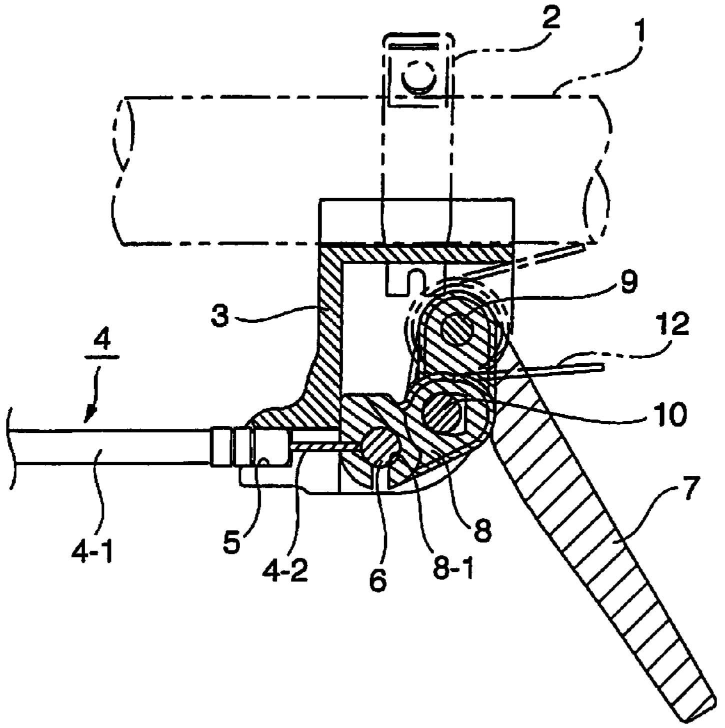
FIG. 3
FIG. 4B
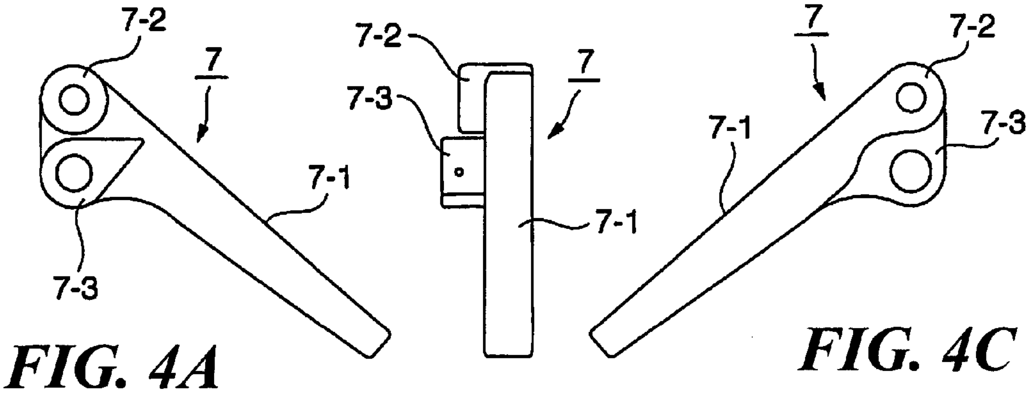
FIG. 4A
FIG. 4C

THROTTLE ADJUSTMENT DEVICE FOR BRUSH CUTTER

CROSS-REFERENCE TO RELATED APPLICATION(S)

This application claims priority from Japanese Patent Application No. 2011-014809 filed on Jan. 27, 2011, the entire content of which is herein incorporated by reference.

FIELD

The present invention relates to a throttle adjustment device for a brush cutter or the like. For example, a brush cutter may include: a handle pipe accommodating a driving shaft thereinside; an engine disposed at one end of the handle pipe; and rotary blades disposed at the other end of the handle pipe to be driven by the engine through the driving shaft. The present invention relates specifically to a throttle adjustment device for adjusting rotation of the engine in such brush cutter.

BACKGROUND

Generally, a brush cutter has an engine driven by using gasoline as fuel, at the rear of a handle pipe. And, rotary blades at the front of the handle pipe driven by the engine through a centrifugal clutch mechanism. In such brush cutter, the user is allowed to control the output (rotation) of the engine by operating a throttle lever with their finger while holding the grip of the handle pipe, as necessary.

For example, JP-4211959-B proposes a throttle adjustment device (lever device) for a brush cutter, as shown in FIG. 13. In the throttle adjustment device, a throttle adjustment wire 53 (Bowden wire) is extended from an engine (not shown), and a drum 54 is provided at an end of the throttle adjustment wire 53. The throttle adjustment device includes a throttle lever 57 having a drum holding portion 55 for holding the drum 54 and an engagement wall 59, and a sub lever 58 having a regulating member 60 to be faced to the engagement wall 59. The throttle lever 57 and the sub lever 58 are rotatably disposed in a case 52 fixed to a handle pipe 51. The rotation range of the throttle lever 57 is adjusted by the sub lever 58 through a contact between the regulating member 60 and the engagement wall 59.

A rotary shaft 61 of the throttle lever 57 is inserted into a guide hole 62 of the case 52. The guide hole 62 guides the rotary shaft 61 such that the throttle lever 57 rotates about a contacting point of the engagement wall 59 and the regulating member 60 as a fulcrum. A turn spring 63 is provided to minimize the stroke of the throttle adjustment wire 53 and to press the grip portion of the throttle lever 57 away from the handle pipe 51. Further, a locking lever 64 is provided opposite to the throttle lever 57 to be engaged/disengaged with respect to the throttle lever 57 at the initial position. The locking lever 64 has an engagement hook 65 to be engaged/disengaged with respect to the drum holding portion 55, and is kept pressed to be normally engaged with the throttle lever 57.

It is assumed that the sub lever 58 is in the position as shown in FIG. 13 (where the sub lever 58 has been frictionally rotated counterclockwise to the maximum). In this state, when the engagement hook 65 of the locking lever 64 is disengaged from the drum holding portion 55 and the throttle lever 57 is strongly gripped, the throttle lever 57 can be maximally rotated until the engagement wall 59 contacts the regulating member 60. As a result, the throttle adjustment wire 53 is drawn out to the maximum, the throttle opening degree is increased to the maximum, and the rotation speed of the engine increases to the maximum. The throttle opening degree can be set to the medium or the minimum by frictionally rotating the sub lever 58 such that the engagement wall 59 contacts the regulating member 60 at a corresponding position.

In the above-mentioned throttle adjustment device, once the sub lever 58 has been frictionally rotated, the throttle opening degree (rotation speed of the engine) can be constantly maintained by simply strongly holding the throttle lever 57, without finely adjusting the holding force. Thus, it is superior in the operability and workability. Moreover, the throttle lever 57 can be locked at the initial position by the locking lever 64 as shown in FIG. 13. Thus, in the non-working time, the engine can be prevented from being unintentionally driven.

However, in the above-mentioned throttle adjustment device, once the throttle lever 57 is locked at the initial position by the locking lever 64 as shown in FIG. 13, the throttle lever 57 can not be moved from the initial position even if a shock, for example, due to the brush cutter falling down is applied thereto. If such shock is applied to the throttle lever 57 being locked, components for locking, such as the throttle lever 57, the drum 54, the drum holding portion 55 and the locking lever 64, may be broken or damaged.

SUMMARY

One object of the present invention is to provide a throttle adjustment device in which, even when large load is applied to a throttle lever being locked, components for locking is prevented from being broken or damaged.

According to an aspect of the present invention, there is provided a throttle adjustment device for a brush cutter in which an engine is mounted at one end of a handle pipe and in which a throttle adjustment wire extends from a throttle of the engine, including: a throttle lever having an operation portion to be operated by the user; a sub lever having a holding portion to be connected with an extending end of the throttle adjustment wire; a case to be fixed to the handle pipe, the throttle lever and the sub lever being rotatably mounted in the case; and a connecting member configured to bring the throttle lever and the sub lever into: an interlocked state where the throttle is adjustable in accordance with an operation amount of the throttle lever; or an un-interlocked state where the throttle is not adjustable regardless of the operation amount of the throttle lever.

According to another aspect of the present invention, there may be provided, based on the above-mentioned structure, the throttle adjustment, wherein, in the case, the throttle lever and the sub lever are rotatably supported by a support shaft in common, the sub lever being rotatably supported at an end thereof opposite to the holding portion, wherein a concavo-convex fitting hole is formed in the sub lever at a position between the support shaft and the holding portion, a convex fitting portion being formed in the concavo-convex fitting hole, and wherein the connecting member is slidable in a direction parallel to the support shaft, the connecting member being lockable with the concavo-convex fitting hole upon being slid.

According to still another aspect of the present invention, there may be provided, based on the above-mentioned structure, the throttle adjustment, wherein the connecting member is a pin member slidable in a direction parallel to a support shaft rotatably supporting the throttle lever and the sub lever, the pin member including: a shank portion to be inserted into a concavo-convex fitting hole formed in the sub lever; and a concave fitting portion formed in the shank portion to be lockable with a convex fitting portion in the concavo-convex fitting hole, wherein a spring is provided to outwardly urge the pin member, and wherein a retaining pin is provided to maintain the pin member at a non-operation position against the spring.

According to the above configurations, the throttle lever to be operated and a sub lever to be connected to the throttle adjustment wire are concentrically and rotatably mounted in the case which is fixed to the handle pipe. The throttle lever and sub lever can be maintained in an un-interlocked state in a normal state by a connecting member provided for interlocking or un-interlocking the throttle lever and the sub lever. As a result, in the normal state, even when the throttle lever is unintentionally rotated with an excessive force, while the engine output is prevented from being increased, the throttle lever is allowed to idly rotate to thereby prevent the components from being broken or damaged by the applied force.

BRIEF DESCRIPTION OF DRAWINGS

FIG. 3 is a cross-sectional view taken along the line A-A of FIG. 2.

FIGS. 4A to 4C illustrate a throttle lever, in which FIG. 4A is a front view, FIG. 4B is a side view, and FIG. 4C is a rear view.

FIGS. 5A to 5D illustrate a sub lever, in which FIG. 5A is a front view, FIG. 5B is a side view, FIG. 5C is a rear view, and FIG. 5D is a perspective view.

FIGS. 6A to 6C illustrate a connecting member (locking pin), in which FIG. 6A is a front view, FIG. 6B is a side view, and FIG. 6C is a perspective view.

DETAILED DESCRIPTION

Figure 1:
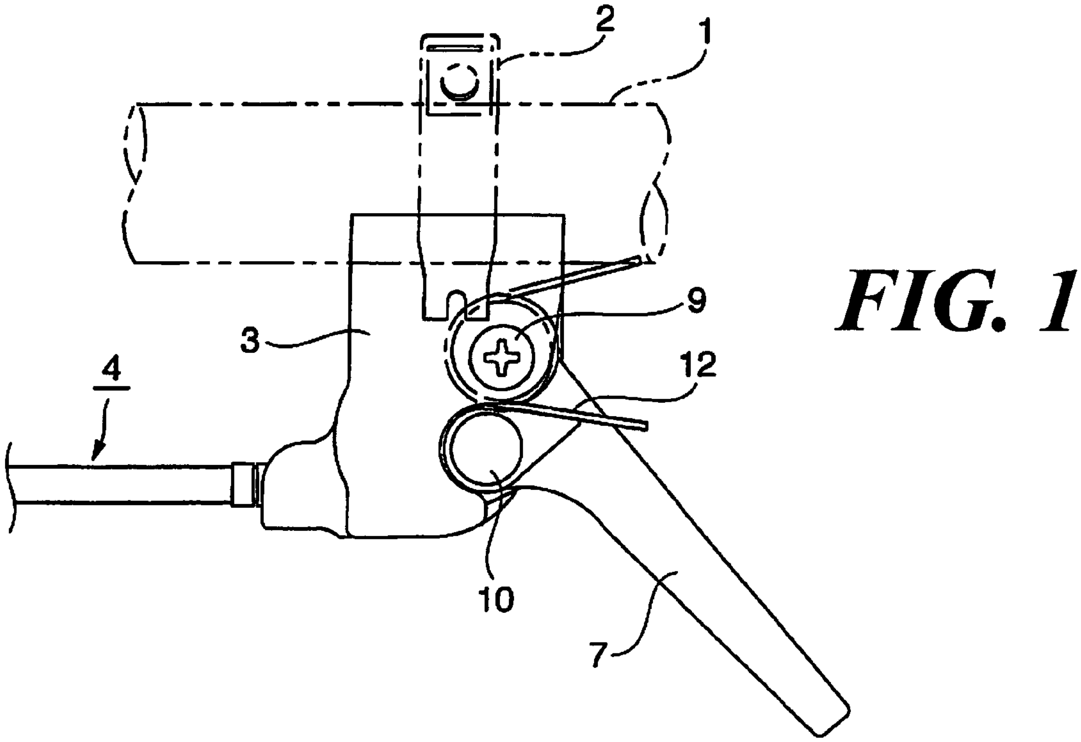
FIG. 1 is a front view of a throttle adjustment device of an embodiment.

FIGS. 1 to 12 illustrate a throttle adjustment device according to the embodiment. The throttle adjustment device includes a handle pipe 1, a fixing band and a case 3. The handle pipe 1 has a grip portion for holding a brush cutter. And, the case 3 has a substantially reversed U-shaped cross-section to be detachably mounted on the handle pipe 1 by the fixing band 2. The case 3 has an introduction portion 5 for a throttle adjustment wire 4. The throttle adjustment wire 4 is composed of an outer wire 4-1 and an inner wire 4-2, and a drum 6 is formed at the end of the inner wire 4-2. The throttle opening degree is increased by drawing out the inner wire 4-2 together with the drum 6, thereby increasing the rotation speed of an engine.

The case 3 houses a throttle lever 7 and a sub lever 8. The throttle lever 7 has an operating portion. The sub lever 8 has a holding portion 8-1 for the drum 6 formed at the end of the throttle adjustment wire 4. Both of the throttle lever 7 and the sub lever 8 are rotatably mounted to the case 3 by a support shaft 9 in common. As shown in FIGS. 4A to 4C, the throttle lever 7 includes an operating portion 7-1, a throttle lever mounting hole 7-2 for the support shaft 9, and a slide hole 7-3 for a connecting member (locking pin) 10. The mounting hole 7-2 and the slide hole 7-3 are formed at one end of the operating portion 7-1. The connecting member (locking pin) 10 to be inserted into the slide hole 7-3 is used for interlocking or un-interlocking the throttle lever 7 and the sub lever 8.

As shown in FIGS. 5A to 5D, the sub lever 8 includes the holding portion 8-1 for the drum 6 at one end, and a sub lever mounting hole 8-2 for the support shaft 9 at the other end. Both ends of the sub lever 8 extend perpendicularly with each other. The sub lever 8 also includes a concavo-convex fitting hole 8-3 and a convex fitting portion 8-4, for the connecting member 10. The concavo-convex fitting hole 8-3 is formed between the holding portion 8-1 and the mounting hole 8-2. The connecting member 10 is slidingly insertable into the concavo-convex fitting hole 8-3 by being pressed in a direction parallel to the support shaft 9 which is inserted into the mounting hole 8-2. The convex fitting portion 8-4 is formed at the end of the concavo-convex fitting hole 8-3.

Figure 6A:
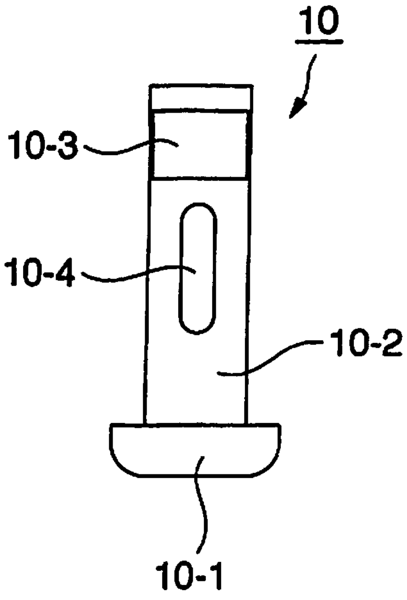
Figure 6B:
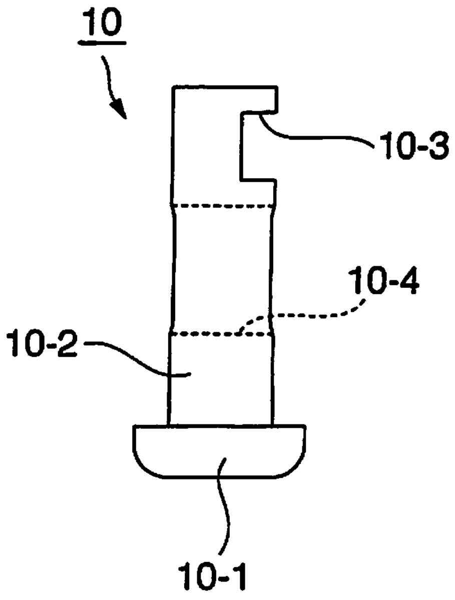
Figure 6C:
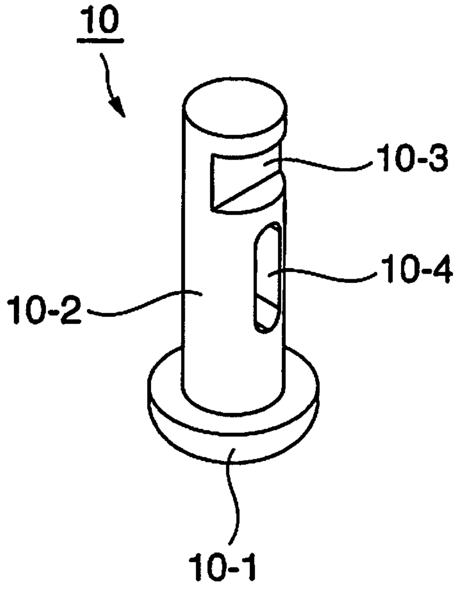

As shown in FIGS. 6A to 6C, the connecting member 10 includes a head portion 10-1 and a shank portion 10-2. The connecting member 10 further includes a convex portion 10-3 to be concavo-convexly fitted to the convex fitting portion 8-4, and a guide slot 10-4 for receiving a retaining pin 14. While the head portion 10-1 is formed at one end of the shank portion 10-2, the convex portion 10-3 is formed at the other end of the shank portion 10-2. And, the guide slot 10-4 is formed at the middle portion of the shank portion 10-2.

Figure 2:
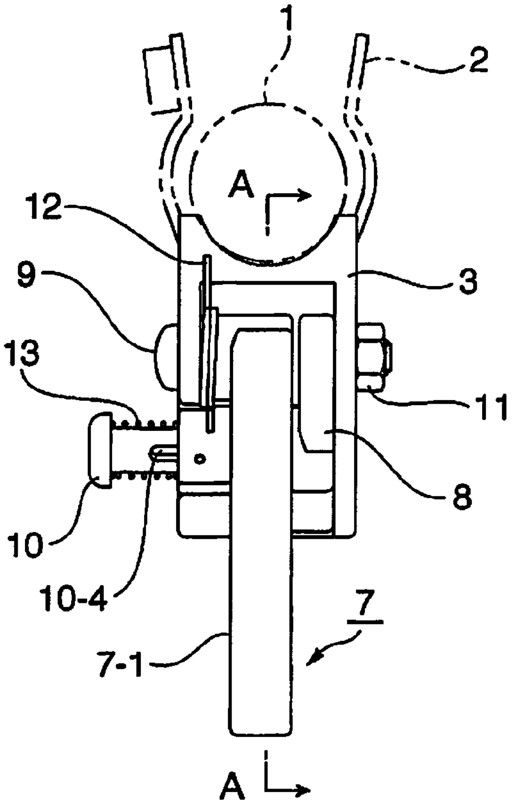
FIG. 2 is a right side view of the throttle adjustment device.
Figure 5A:
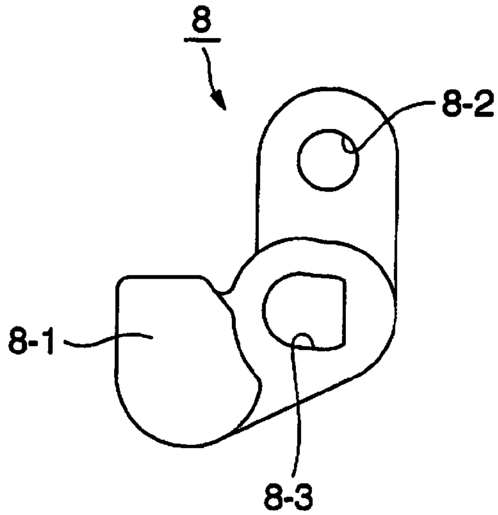
Figure 5B:
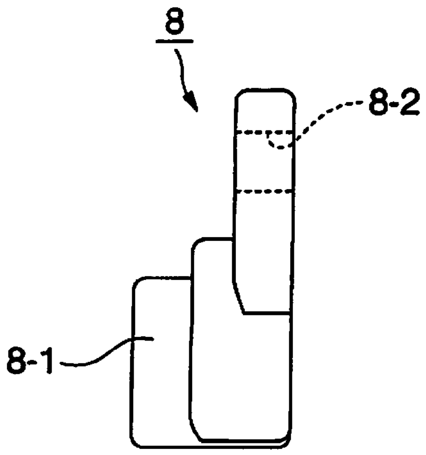
Figure 5C:
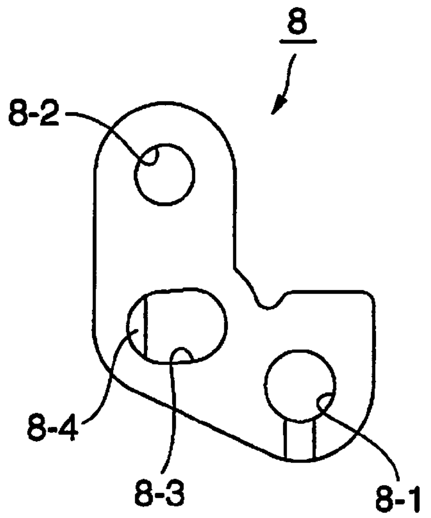
Figure 5D:
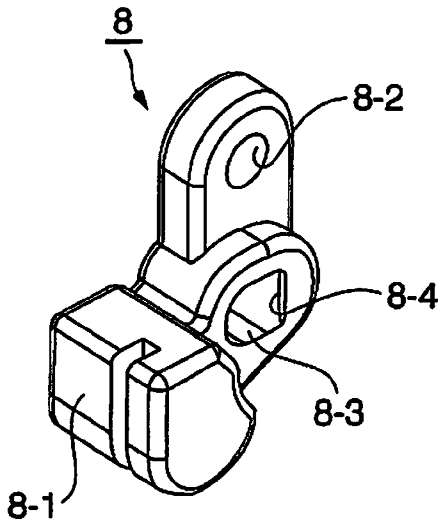

The throttle lever 7 and the sub lever 8 are rotatably mounted in the case 3 by the support shaft 9 and a nut 11, such that the support shaft 9 penetrates through the case 3, the mounting hole 7-2 of the throttle lever 7 and the mounting hole 8-2 of the sub lever 8. A return spring 12 is mounted on the outer circumference of the mounting hole 7-2 to urge the throttle lever 7 toward the initial position as shown in FIGS. 1 to 3. The connecting member 10 is slidably inserted into the slide hole 7-3 of the throttle lever 7. A return spring 13 is mounted between the throttle lever 7 and the head 10-1 to outwardly urge the connecting member 10. While the connecting member 10 is urged by the return spring 13 toward the initial position, the connecting member 10 is slidingly insertable into the concavo-convex fitting hole 8-3 by being pressed. A retaining pin 14 is mounted to the throttle lever 7 while being inserted into the guide slot 10-4 to thereby maintain the connecting member 10 at a non-operation position.

Figure 7:
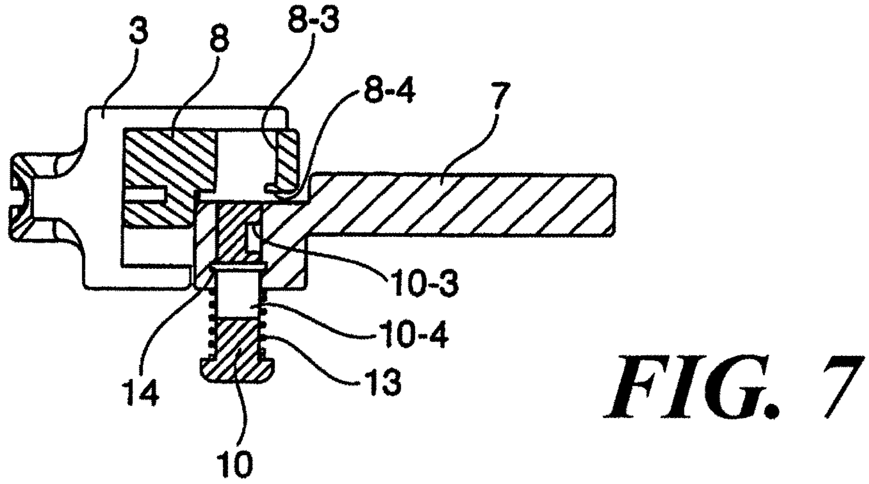
FIG. 7 illustrates a normal state.
Figure 11:
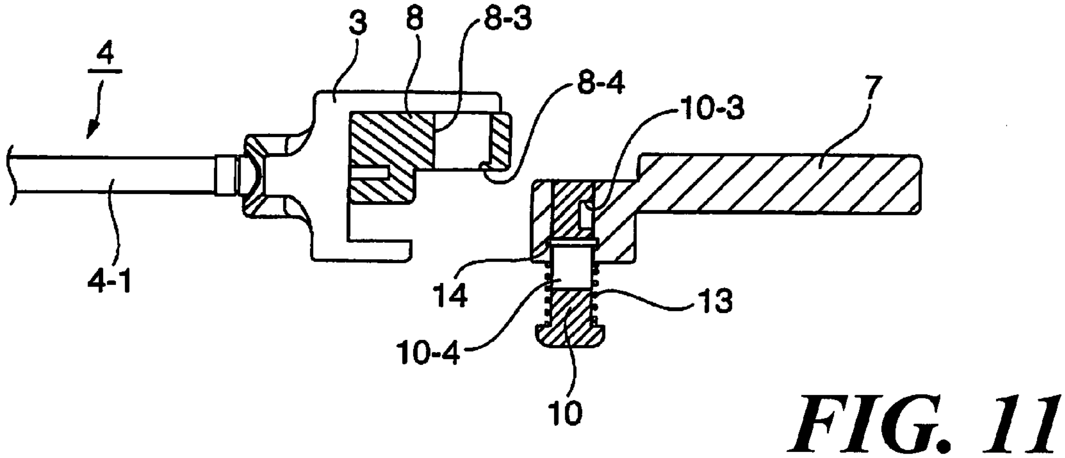
FIG. 11 illustrates an idling state where the throttle lever is rotated without pressing the connecting member from the normal state (FIG. 7).
Figure 12:
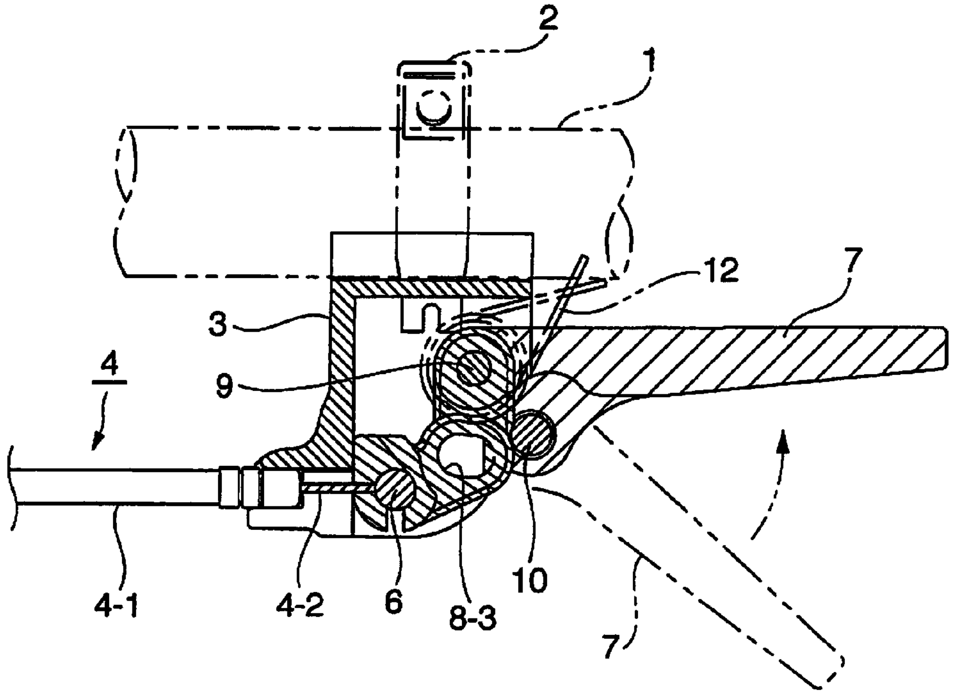
FIG. 12 illustrates the idling state (FIG. 11), correspondingly with the cross-sectional view of FIG. 3.
Figure 13:
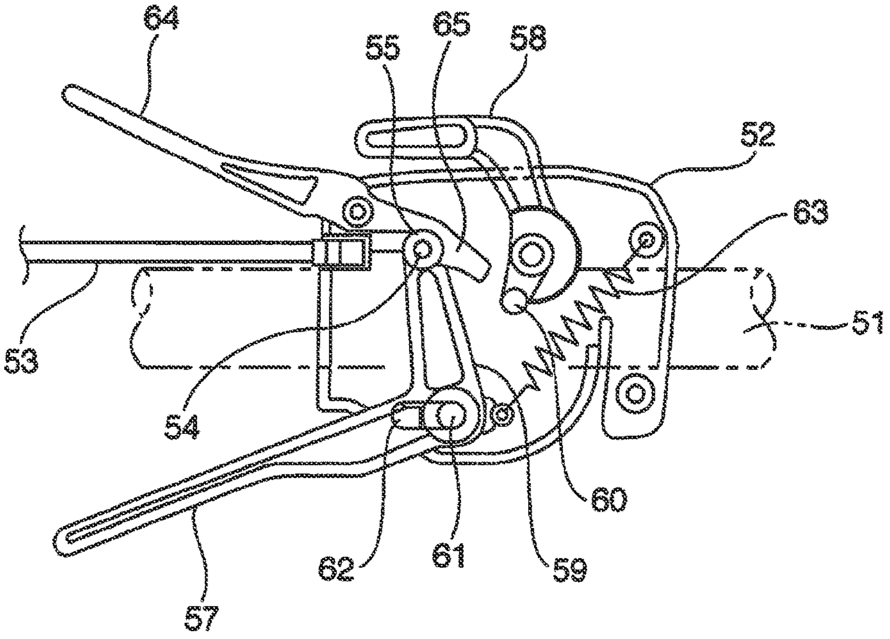
FIG. 13 PRIOR ART
FIG. 13 illustrates a related-art throttle adjustment device.

Next, the operation of the above-mentioned throttle adjustment device will be described. In the normal state as shown in FIGS. 3 and 7, the head 10-1 side end of the connecting member 10 is outwardly urged by the return spring 13 to protrude from the slide hole 7-3 of the throttle lever 7, and the opposite end of the connecting member 10 is not inserted into the concavo-convex fitting hole 8-3 of the sub lever 8. Thus, the throttle lever 7 and the sub lever 8 are remained in the un-interlocked state. In this state, even when the throttle lever 7 is rotated toward the handle pipe 1, as shown in FIGS. 11 and 12, the sub lever 8 is not rotated, and therefore, the inner wire 4-2 of the throttle adjustment wire 4 is not drawn out. As a result, the engine remains idling, and the rotary blades (not shown) mounted on the front of the handle pipe 1 do not rotate.

Figure 8:
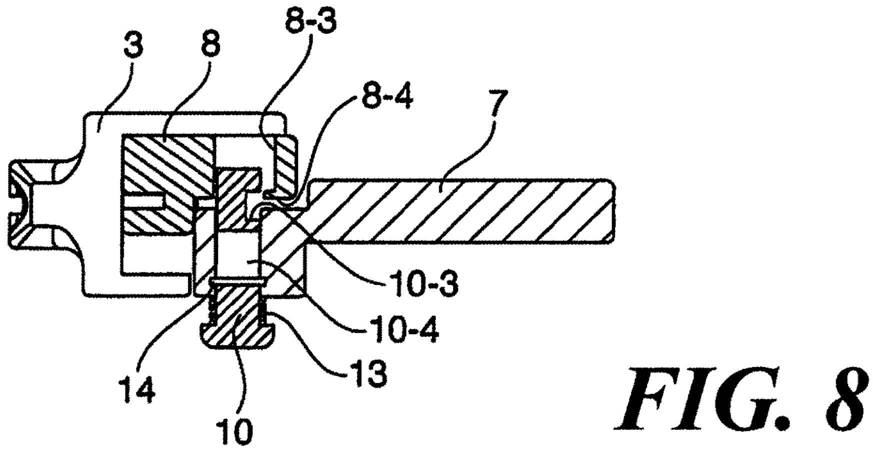
FIG. 8 illustrates a first action state where the connecting member is pressed from the normal state (FIG. 7).
Figure 9:
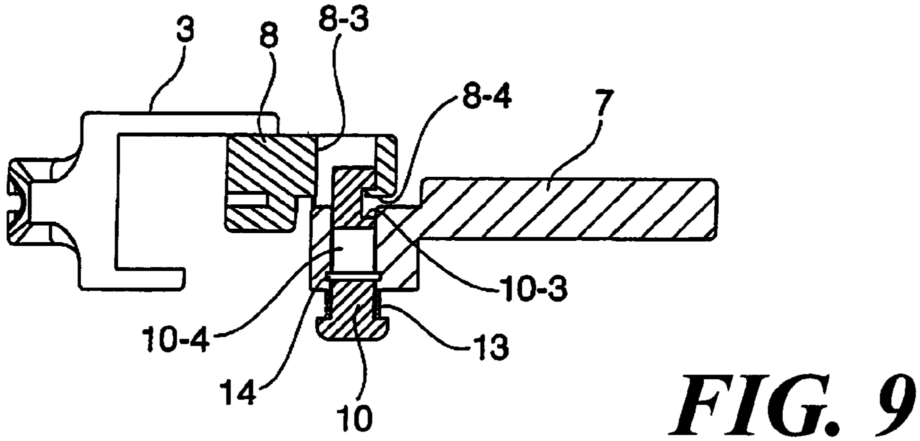
FIG. 9 illustrates a second action state whether the throttle lever is rotated (the throttle opening degree is increased) following the first action state (FIG. 8).
Figure 10:
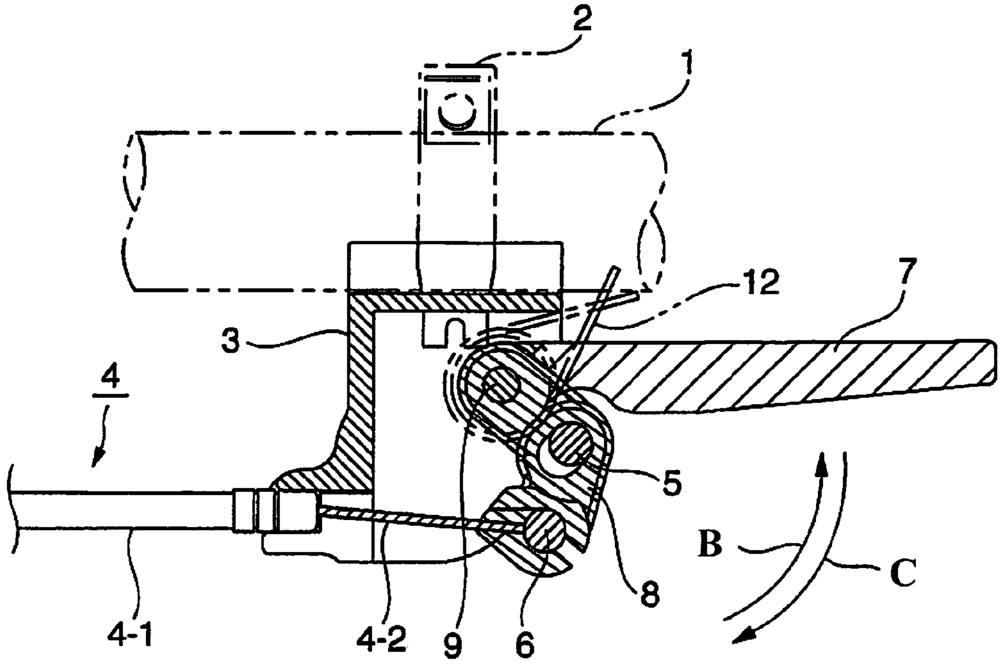
FIG. 10 illustrates the second action state (FIG. 9), correspondingly with the cross-sectional view of FIG. 3

By pressing the connecting member 10 against the return spring 13 from the normal state (initial position) of FIG. 7, the concave fitting portion 10-3 of the connecting member 10 is concavo-convexly fitted to the convex fitting portion 8-4 of the sub lever 8 as shown in FIG. 8. After that, by slightly rotating the throttle lever 7 in the direction of arrow B (FIG. 10) from the state of FIG. 8, the throttle lever 7 and the sub lever 8 are brought into the interlocked state. By further rotating the throttle lever 7, the sub lever 8 moves interlockedly with the throttle lever 7 through the connecting member 10 as shown in FIGS. 9 and 10, thereby drawing out the inner wire 4-2 of the throttle adjustment wire 4 and increasing the throttle opening degree.

In this state, in a range where the throttle opening degree is sufficiently large, the connecting member 10 does not return to the initial position because of the locking between the sub lever 8 and the connecting member 10, even when the pressing of the connecting member 10 is released (free state). When the throttle lever 7 is released, the throttle lever 7 and the sub lever 8 are rotated in the direction of arrow C (FIG. 10) from the above state by the return spring 12, and the throttle lever 7 and the sub lever 8 return to their initial positions. Then, the locking between the sub lever 8 and the connecting member 10 is released, and the connecting member 10 returns to the initial position by the return spring 13. Thus, the throttle lever 7 and the sub lever 8 return to the un-interlocked state as shown in FIG. 7. In this state, even when the user carelessly contacts the throttle lever 7, the throttle lever 7 is merely idly rotated toward the handle pipe 1, and throttle-up does not occur. Further, even when the connecting member 10 is pressed in a state where the throttle lever 7 is idly rotated against the return spring 12, since the connecting member 10 and the sub lever 8 are not concavo-convexly fitted with each other (FIG. 11), throttle-up does not occur.

As described above, in the throttle adjustment device of the embodiment, when the throttle lever 7 is rotated toward the handle pipe 1 against the return spring 12 after the connecting member 10 is pressed, the throttle lever 7 and the sub lever 8 are brought into the interlocked state by the connecting member 10, and the inner wire 4-2 of the throttle adjustment wire 4 is drawn out to increase the throttle opening degree. And, when the throttle lever 7 is released, the throttle lever 7 and the sub lever 8 return to their initial positions by the return spring 12, and the connecting member 10 also returns to the initial position by the return spring 13. Thus, the throttle lever 7 and the sub lever 8 return into the un-interlocked state. In this state, even when the throttle lever 7 is unintentionally operated, although the throttle lever 7 merely idly rotates, the inner wire 4-2 of the throttle adjustment wire 4 is not drawn out. Thus, throttle-up does not occur, and the engine output is not increased. Further, since the throttle lever is allowed to idly rotate, the components of the throttle adjustment device are prevented from being broken or damaged even when an excessive force is applied to the throttle lever 7.

Although a throttle adjustment device for a brush cutter is exemplified, the embodiment may be applied to a throttle adjustment device for controlling the rotation speed of other types of engines.

The throttle adjustment device of the embodiment has a throttle lever to be operated and a sub lever to be connected to the throttle adjustment wire, and the throttle lever and the sub lever are concentrically and rotatably mounted in a case which is fixed to a handle pipe. Further, there is provided a connecting member for not only maintaining the throttle lever and sub lever in the un-interlocked state in a normal state, bus also for bringing them into the interlocked state upon being operated. As a result, according to the throttle adjustment device of the embodiment, in the normal state, even when the throttle lever is unintentionally rotated with an excessive force, while the engine output is prevented from being increased, the throttle lever is allowed to idly rotate to thereby prevent the components from being broken or damaged by the applied force.

The invention claimed is:

1. A throttle adjustment device for a brush cutter in which an engine is mounted at one end of a handle pipe and in which a throttle adjustment wire extends from a throttle of the engine, comprising:

a throttle lever having an operation portion to be operated by a user;

a sub lever having a holding portion to be connected with an extending end of the throttle adjustment wire;

a case to be fixed to the handle pipe, the throttle lever and the sub lever being rotatably mounted in the case on a common axis via a support shaft; and a connecting member separate from the throttle lever and the sub lever and selectively coupling and uncoupling the throttle lever and the sub lever respectively between an interlocked state where the connecting member engages both the throttle lever and the sub lever such that the throttle is adjustable in accordance with an operation amount of the throttle lever and an un-interlocked state where the connecting member engages only one of the throttle lever and the sub lever such that the throttle is not adjustable regardless of the operation amount of the throttle lever, and wherein the connecting member is biased toward the un-interlocked state.

2. The throttle adjustment device of claim 1, wherein the sub lever is rotatably supported at an end thereof opposite to the holding portion, wherein a concavo-convex fitting hole is formed in the sub lever at a position between the support shaft and the holding portion, a convex fitting portion being formed in the concavo-convex fitting hole, and wherein the connecting member is slidable relative to the throttle lever and the sub lever in a direction parallel to the support shaft, the connecting member being lockable with the concavo-convex fitting hole upon being slid.

3. The throttle adjustment device of claim 1, wherein the connecting member is a pin member slidable in a direction parallel to the support shaft rotatably supporting the throttle lever and the sub lever, the pin member including:

a shank portion to be inserted into a concavo-convex fitting hole formed in the sub lever; and a concave fitting portion formed in the shank portion to be lockable with a convex fitting portion in the concavo-convex fitting hole, wherein a spring is provided to outwardly urge the pin member, and wherein a retaining pin is provided to maintain the pin member at a non-operation position against the spring.

4. The throttle adjustment device of claim 1, wherein each of the throttle lever and the sub lever comprises a corresponding mounting hole in which the supporting shaft is engaged, and wherein the throttle lever comprises a slide hole offset from the throttle lever mounting hole, and the sub lever comprises a fitting hole offset from the sub lever mounting hole, the connecting member being positionable in the slide hole and the fitting hole in the interlocked state.

5. The throttle adjustment device of claim 4, wherein the connecting member is secured to the one of the throttle lever and the sub lever via a retaining pin.

6. The throttle adjustment device of claim 1, wherein in the un-interlocked state, the connecting member engages the throttle lever only.

7. The throttle adjustment device of claim 6, wherein the connecting member comprises a slot, and wherein the connecting member is secured to the throttle lever by a retaining pin extending through the slot.

8. A throttle adjustment device for positioning a throttle adjustment wire extending from an engine throttle, the throttle adjustment device comprising:

a throttle lever including a throttle lever mounting hole and a slide hole offset from the throttle lever mounting hole;

a sub lever having a holding portion to be connected with an extending end of the throttle adjustment wire, the sub lever including a sub lever mounting hole aligned with the throttle lever mounting hole and a fitting hole offset from the sub lever mounting hole;

a case, wherein the throttle lever and the sub lever are rotatably mounted in the case on a common axis via a support shaft extending through the throttle lever and sub lever mounting holes; and a connecting member selectively coupling and uncoupling the throttle lever and the sub lever respectively between (1) an interlocked state where the connecting member engages the slide hole of the throttle lever and the fitting hole of the sub lever such that the throttle is adjustable in accordance with an operation amount of the throttle lever, and (2) an un-interlocked state where the connecting member engages only one of the slide hole and the fitting hole such that the throttle is not adjustable regardless of the operation amount of the throttle lever, wherein the connecting member is biased toward the un-interlocked state.

9. The throttle adjustment device of claim 8, wherein in the un-interlocked state, the connecting member engages the slide hole of the throttle lever only.

* * * * *